(12) United States Patent
Beers et al.

(10) Patent No.: US 8,058,837 B2
(45) Date of Patent: Nov. 15, 2011

(54) CHARGING SYSTEM FOR AN ARTICLE OF FOOTWEAR

(75) Inventors: Tiffany A. Beers, Portland, OR (US);
Michael R. Friton, Portland, OR (US);
Tinker L. Hatfield, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 383 days.

(21) Appl. No.: 12/369,410

(22) Filed: Feb. 11, 2009

(65) Prior Publication Data

US 2009/0273311 A1    Nov. 5, 2009

Related U.S. Application Data

(63) Continuation-in-part of application No. 12/114,022, filed on May 2, 2008.

(51) Int. Cl.
*H02J 7/00* (2006.01)
*A43B 23/00* (2006.01)
*F21V 21/08* (2006.01)

(52) U.S. Cl. ........ 320/108; 320/107; 320/114; 320/115; 36/137; 362/103

(58) Field of Classification Search .................... 320/114
See application file for complete search history.

(56) References Cited

U.S. PATENT DOCUMENTS

| | | | |
|---|---|---|---|
| 1,184,396 A | 5/1916 | Trimble | |
| 3,008,038 A | 11/1961 | Dickens et al. | |
| 3,070,907 A | 1/1963 | Rocco | |
| 3,893,247 A | 7/1975 | Dana, III | |
| 3,946,505 A | 3/1976 | Dana, III | |
| 4,020,572 A | 5/1977 | Chiaramonte, Jr. | |
| 4,112,601 A | 9/1978 | Chiaramonte, Jr. | |
| 4,130,951 A | 12/1978 | Powell | |
| 4,158,922 A | 6/1979 | Dana, III | |
| 4,253,253 A | 3/1981 | McCormick | |
| 4,426,796 A | 1/1984 | Spademan | |
| 4,433,456 A | 2/1984 | Baggio | |
| 4,551,933 A | 11/1985 | Morell et al. | |
| 4,619,057 A | 10/1986 | Sartor et al. | |
| 4,724,626 A | 2/1988 | Baggio | |
| 4,741,115 A | 5/1988 | Pozzobon | |
| 4,848,009 A | 7/1989 | Rodgers | |
| 4,895,110 A | 1/1990 | LoCascio | |
| 4,922,634 A | 5/1990 | Seidel | |
| 4,999,936 A | 3/1991 | Calamia et al. | |
| 5,033,212 A | 7/1991 | Evanyk | |
| 5,157,813 A | 10/1992 | Carroll | |

(Continued)

FOREIGN PATENT DOCUMENTS

EP    0 121 026    10/1984

(Continued)

OTHER PUBLICATIONS

International Preliminary Report on Patentability mailed Nov. 11, 2010 in International Application No. PCT/US2009/042072.

(Continued)

*Primary Examiner* — Patrick Assouad
*Assistant Examiner* — Nathaniel Pelton
(74) *Attorney, Agent, or Firm* — Plumsea Law Group, LLC

(57) ABSTRACT

An article of footwear and a footwear housing is disclosed. The footwear housing includes a charging station that can be used to charge a battery in the footwear housing.

20 Claims, 10 Drawing Sheets

U.S. PATENT DOCUMENTS

| | | | |
|---|---|---|---|
| 5,174,051 | A | 12/1992 | Walkhoff et al. |
| 5,188,447 | A | 2/1993 | Chiang et al. |
| 5,205,055 | A | 4/1993 | Harrell |
| 5,245,516 | A | 9/1993 | de Haas et al. |
| 5,285,586 | A | 2/1994 | Goldston et al. |
| 5,303,131 | A | 4/1994 | Wu |
| 5,303,485 | A | 4/1994 | Goldston et al. |
| 5,329,432 | A | 7/1994 | Bland |
| 5,373,651 | A * | 12/1994 | Wood ............................ 36/114 |
| 5,381,615 | A | 1/1995 | MacMillan |
| 5,396,720 | A | 3/1995 | Hwang et al. |
| 5,406,724 | A | 4/1995 | Lin |
| 5,408,764 | A | 4/1995 | Wut |
| 5,457,900 | A | 10/1995 | Roy |
| 5,461,188 | A | 10/1995 | Drago et al. |
| 5,469,342 | A | 11/1995 | Chien |
| 5,479,325 | A | 12/1995 | Chien |
| 5,483,759 | A | 1/1996 | Silverman |
| 5,490,338 | A | 2/1996 | Hwang et al. |
| 5,495,136 | A | 2/1996 | Chiang et al. |
| 5,500,635 | A | 3/1996 | Mott |
| 5,546,681 | A | 8/1996 | Goldston et al. |
| 5,570,945 | A | 11/1996 | Chien et al. |
| 5,572,817 | A | 11/1996 | Chien |
| 5,599,088 | A | 2/1997 | Chien |
| 5,611,621 | A | 3/1997 | Chien |
| 5,644,858 | A | 7/1997 | Bemis |
| 5,647,104 | A | 7/1997 | James |
| 5,649,755 | A | 7/1997 | Rapisarda |
| 5,651,197 | A | 7/1997 | James |
| 5,692,324 | A | 12/1997 | Goldston et al. |
| 5,704,705 | A | 1/1998 | Chien |
| 5,704,706 | A | 1/1998 | Goldston et al. |
| 5,732,486 | A | 3/1998 | Rapisarda |
| 5,746,499 | A | 5/1998 | Ratcliffe et al. |
| 5,771,611 | A | 6/1998 | Chang |
| 5,791,021 | A | 8/1998 | James |
| 5,794,366 | A | 8/1998 | Chien |
| 5,806,960 | A | 9/1998 | Chien |
| 5,812,063 | A | 9/1998 | Weng et al. |
| 5,813,148 | A | 9/1998 | Guerra |
| 5,829,169 | A | 11/1998 | James |
| 5,839,210 | A | 11/1998 | Bernier et al. |
| 5,857,273 | A | 1/1999 | Rapisarda |
| 5,860,727 | A | 1/1999 | Chien |
| 5,865,523 | A | 2/1999 | Chien |
| 5,866,987 | A | 2/1999 | Wut |
| 5,879,069 | A | 3/1999 | Chien |
| 5,894,201 | A | 4/1999 | Wong |
| 5,894,686 | A | 4/1999 | Parker et al. |
| 5,909,088 | A | 6/1999 | Wut |
| 5,930,921 | A | 8/1999 | Sorofman et al. |
| 5,933,985 | A | 8/1999 | James |
| 5,934,599 | A | 8/1999 | Hammerslag |
| 5,947,580 | A | 9/1999 | Chien |
| 5,955,957 | A | 9/1999 | Calabrese et al. |
| 5,969,479 | A | 10/1999 | Wong |
| 6,012,822 | A | 1/2000 | Robinson |
| 6,017,128 | A | 1/2000 | Goldston et al. |
| 6,032,387 | A | 3/2000 | Johnson |
| 6,104,140 | A | 8/2000 | Wut et al. |
| 6,112,437 | A | 9/2000 | Lovitt |
| 6,202,953 | B1 | 3/2001 | Hammerslag |
| 6,280,045 | B1 | 8/2001 | Anteby et al. |
| 6,289,558 | B1 | 9/2001 | Hammerslag |
| 6,457,261 | B1 | 10/2002 | Crary |
| 6,619,812 | B2 | 9/2003 | Rapisarda |
| 6,691,433 | B2 | 2/2004 | Liu |
| 6,764,193 | B1 | 7/2004 | Wei |
| 6,789,913 | B2 | 9/2004 | Wei |
| 6,837,590 | B2 | 1/2005 | Marston |
| 6,843,578 | B1 | 1/2005 | Cheung |
| 6,896,128 | B1 | 5/2005 | Johnson |
| 6,925,734 | B1 | 8/2005 | Schaeffer |
| 6,991,342 | B2 | 1/2006 | Gonet |
| 7,114,822 | B2 | 10/2006 | Guzman |
| 7,147,337 | B1 | 12/2006 | Rapisarda |
| 7,178,929 | B2 | 2/2007 | Guzman |
| 7,181,870 | B2 | 2/2007 | Guzman |
| 7,188,439 | B2 | 3/2007 | DiBenedetto et al. |
| 7,225,565 | B2 | 6/2007 | DiBenedetto et al. |
| 7,255,468 | B2 | 8/2007 | Capriola |
| 7,395,614 | B1 * | 7/2008 | Bailey et al. ...................... 36/28 |
| 7,503,131 | B2 | 3/2009 | Nadel et al. |
| 7,510,293 | B2 * | 3/2009 | Chyn ............................ 362/103 |
| 7,752,774 | B2 * | 7/2010 | Ussher ........................... 36/50.1 |
| 7,794,101 | B2 * | 9/2010 | Galica et al. .................. 362/103 |
| 2003/0070324 | A1 | 4/2003 | Nelson |
| 2004/0103563 | A1 | 6/2004 | Linge |
| 2004/0255490 | A1 | 12/2004 | Wan et al. |
| 2005/0018417 | A1 | 1/2005 | Chien |
| 2005/0018450 | A1 | 1/2005 | Chien |
| 2005/0198867 | A1 | 9/2005 | Labbe |
| 2005/0207138 | A1 | 9/2005 | Cheung |
| 2005/0235523 | A1 * | 10/2005 | Flechsig et al. ................. 36/3 R |
| 2005/0286244 | A1 | 12/2005 | Weng |
| 2005/0286248 | A1 | 12/2005 | Weng |
| 2006/0007668 | A1 | 1/2006 | Chien |
| 2006/0007670 | A1 | 1/2006 | Chien |
| 2006/0101674 | A1 | 5/2006 | Ungari |
| 2006/0156517 | A1 | 7/2006 | Hammerslag et al. |
| 2006/0198121 | A1 | 9/2006 | Thorpe et al. |
| 2006/0221596 | A1 | 10/2006 | Chang |
| 2006/0262517 | A1 | 11/2006 | Doerer et al. |
| 2007/0000154 | A1 | 1/2007 | DiBenedetto et al. |
| 2007/0011920 | A1 | 1/2007 | DiBenedetto et al. |
| 2007/0028486 | A1 * | 2/2007 | Montanya et al. .............. 36/137 |
| 2007/0041193 | A1 | 2/2007 | Wong et al. |
| 2007/0147026 | A1 | 6/2007 | Tseng |
| 2007/0180736 | A1 | 8/2007 | DiBenedetto et al. |
| 2007/0180737 | A1 | 8/2007 | DiBenedetto et al. |
| 2007/0201221 | A1 | 8/2007 | Cherdak et al. |
| 2007/0211451 | A1 | 9/2007 | Chung |
| 2007/0236915 | A1 | 10/2007 | Chen |
| 2007/0267398 | A1 * | 11/2007 | McCoy et al. ................. 219/211 |
| 2008/0054845 | A1 * | 3/2008 | Wang ............................ 320/111 |
| 2008/0086911 | A1 | 4/2008 | Labbe |
| 2008/0197126 | A1 * | 8/2008 | Bourke et al. ................. 219/634 |
| 2008/0246439 | A1 * | 10/2008 | Tsui et al. ..................... 320/137 |
| 2010/0033321 | A1 * | 2/2010 | Kaminski et al. ......... 340/539.13 |
| 2010/0115799 | A1 * | 5/2010 | Welter et al. .................... 36/137 |

FOREIGN PATENT DOCUMENTS

| | | |
|---|---|---|
| EP | 0 534 560 | 3/1993 |
| FR | 2643794 | 9/1990 |
| JP | 10225305 | 8/1998 |
| WO | WO 94/15494 | 7/1994 |

OTHER PUBLICATIONS

Back to the Future Part II (Universal Pictures 1989), first appearance of bag at 7:24.

* cited by examiner

CHARGING SYSTEM FOR AN ARTICLE OF FOOTWEAR

CROSS-REFERENCE TO RELATED APPLICATION

This application is a continuation-in-part of U.S. patent application Ser. No. 12/114,022, entitled "Automatic Lacing System", filed on May 2, 2008 and published on Nov. 5, 2009 as U.S. Patent Application Publication Number 2009/0272007, which application is incorporated herein by reference and is referred to herein as "the automatic lacing system case".

BACKGROUND

The present invention relates generally to footwear, and in particular the present invention relates to a charging system for an article of footwear.

Charging systems have previously been proposed. In particular, inductive charging systems have been used in some consumer electronic devices including electric toothbrushes and cell phones.

SUMMARY

The invention discloses an article of footwear including a charging system. In one aspect, the invention provides a footwear housing for an article of footwear, comprising: an interior portion that is configured to receive the article of footwear; a charging ECU associated with the interior portion and configured to receive power from an external power source; an external inductive loop in communication with the charging ECU; and wherein the external inductive loop is associated with an internal inductive loop of the article of footwear.

In another aspect, the interior portion includes a locating feature configured to facilitate alignment of the article of footwear on a floor portion of the interior portion.

In another aspect, the locating feature facilitates alignment of the external inductive loop with the internal inductive loop of the article of footwear in a manner that facilitates inductive coupling of the article of footwear with the footwear housing.

In another aspect, the external inductive loop is disposed below the floor portion.

In another aspect, the charging ECU is disposed below the floor portion.

In another aspect, the external inductive loop is spaced apart from a lower surface of the article of footwear.

In another aspect, the footwear housing includes a first panel portion and a second panel portion that provide access to the interior portion.

In another aspect, the first panel portion and the second panel portion can be closed.

In another aspect, the footwear housing can be used to transport the article of footwear.

In another aspect, the invention provides a charging system for an article of footwear, comprising: a rechargeable power source disposed inside the article of footwear, the rechargeable power source being configured to power a lighting system; a footwear housing configured to receive the article of footwear, the footwear housing being associated with an external power source; an internal inductive loop disposed inside the article of footwear, the internal inductive loop configured to transfer power to the rechargeable power source; an external inductive loop disposed inside the footwear housing, the external inductive loop configured to receive power from the external power source; and where the internal inductive loop and the external inductive loop are inductively coupled when the footwear is disposed inside the footwear housing.

In another aspect, the external inductive loop is configured to generate an alternating magnetic field.

In another aspect, the alternating magnetic field generated by the external inductive loop creates an alternating current in the internal inductive loop.

In another aspect, the current generated in the internal inductive loop is used to charge the rechargeable power source in the article of footwear.

In another aspect, the rechargeable power source is charged whenever the article of footwear is disposed inside the footwear housing in a manner that aligns the internal inductive loop with the external inductive loop.

In another aspect, the footwear housing can be used to recharge a pair of footwear simultaneously using a pair of external inductive loops that may be coupled with corresponding internal inductive loops in the pair of footwear.

In another aspect, the rechargeable power source can be used to power an automatic fastening system.

In another aspect, the invention provides a method of charging an article of footwear, comprising the steps of: connecting a footwear housing to an external power source, the footwear housing comprising a charging station with an external inductive loop; associating the article of footwear including an internal inductive loop with the footwear housing, the internal inductive loop being configured to transfer power to a rechargeable power source within the article of footwear; aligning the article of footwear within the footwear housing in a manner that inductively couples the internal inductive loop with the external inductive loop; and thereby charging the rechargeable power source.

In another aspect, the rechargeable power source is configured to provide power to a lighting system of the article of footwear.

In another aspect, the step of aligning the article of footwear within the footwear housing includes a step of using at least one locating feature disposed within the footwear housing.

In another aspect, the step of associating the footwear housing with an external power source comprises a step of plugging in a cord to a wall socket.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
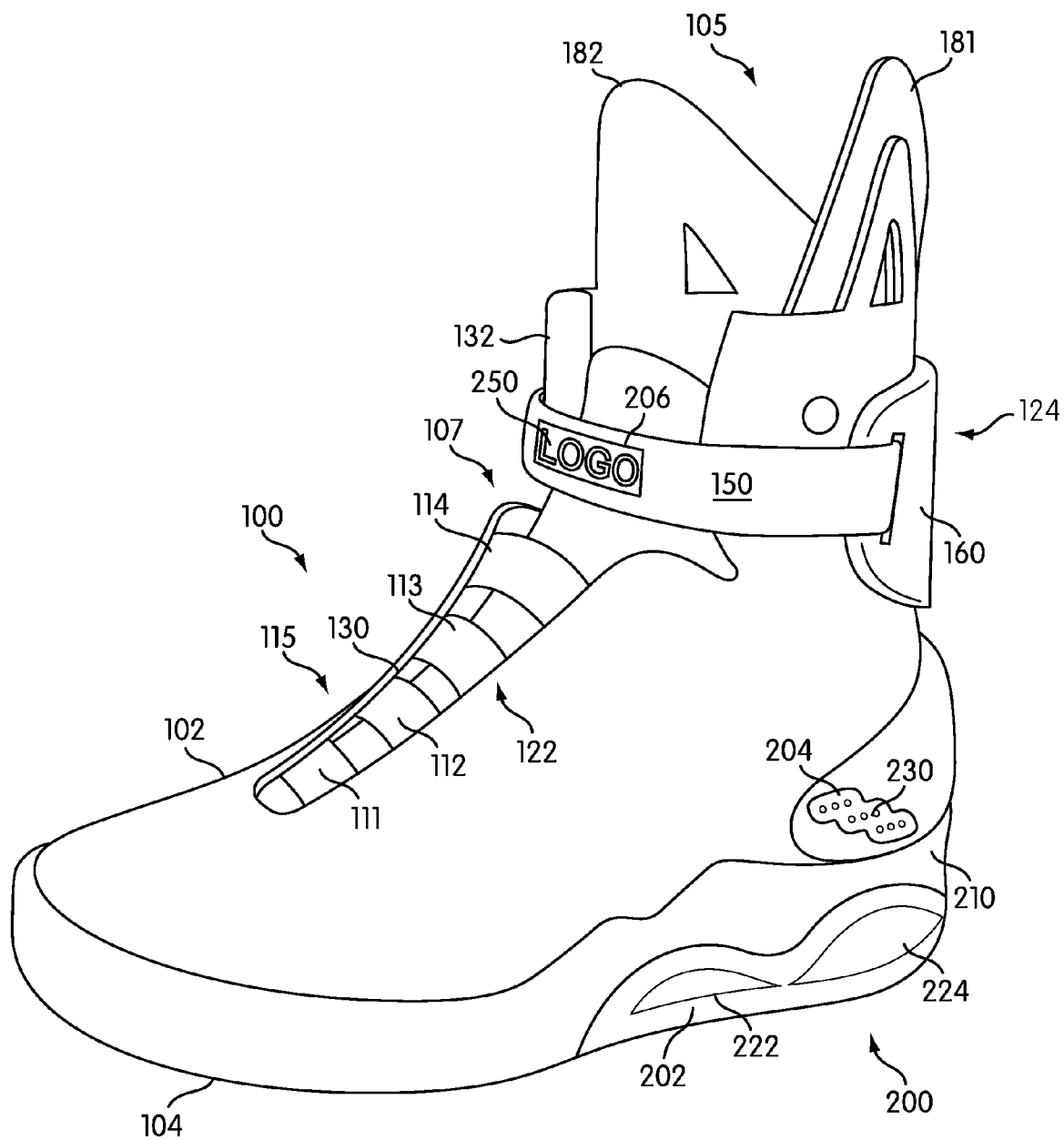
FIG. 1 is an isometric view of an embodiment of an article of footwear with a lighting system.

FIG. 1 is a preferred embodiment of article of footwear 100, also referred to simply as article 100, in the form of an athletic shoe. For clarity, the following detailed description discusses a preferred embodiment, however, it should be kept in mind that the present invention could also take the form of any other kind of footwear, including, for example, skates, boots, ski boots, snowboarding boots, cycling shoes, formal shoes, slippers or any other kind of footwear.

Article 100 preferably includes upper 102. Upper 102 includes entry hole 105 that allows a foot to enter upper 102. In some cases, upper 102 also includes an interior cavity that is configured to receive the foot. In particular, entry hole 105 preferably provides access to the interior cavity.

In some embodiments, upper 102 may be associated with sole 104. In one embodiment, upper 102 is attached to sole 104. In some cases, upper 102 is connected to sole 104 by stitching or an adhesive. In other cases, upper 102 could be integrally formed with sole 104.

In some cases, sole 104 comprises a midsole. In some embodiments, sole 104 could also include an insole that is configured to contact a foot. In other embodiments, sole 104 could include an outsole that is configured to contact a ground surface. In an exemplary embodiment, sole 104 may comprise a midsole as well as an outsole and an insole.

Generally, sole 104 may be provided with provisions for increasing traction depending on the intended application of article of footwear 100. In some embodiments, sole 104 may include a variety of tread patterns. In other embodiments, sole 104 may include one or more cleats. In still other embodiments, sole 104 could include both a tread pattern as well as a plurality of cleats. It should be understood that these provisions are optional. For example, in still another embodiment, sole 104 could have a generally smooth lower ground contacting surface.

Upper 102 may have any design. In some embodiments, upper 102 may have the appearance of a low top sneaker. In other embodiments, upper 102 may have the appearance of a high top sneaker. In this exemplary embodiment, upper 102 may include a high ankle portion 132. In particular, upper 102 may include first extended portion 181 and second extended portion 182. In this embodiment, first extended portion 181 and second extended portion 182 have generally triangular shapes. In other embodiments, first extended portion 181 and second extended portion 182 could have another shape. Examples of other shapes include, but are not limited to, rounded shapes, rectangular shapes, polygonal shapes, regular shapes as well as irregular shapes. Using this configuration for ankle portion 132 may help provide upper 102 with additional support for an ankle.

Article 100 may include provisions for tightening upper 102 around a foot. In some embodiments, article 100 may be associated with laces, straps and/or fasteners for tightening upper 102 once a foot has been inserted into upper 102. In some cases, article 100 may include laces, straps and/or fasteners that can be manually adjusted by a user. In other cases, article 100 may include provisions for automatically adjusting laces, straps and/or other fasteners associated with upper 102. By using automatically adjusting laces, straps and/or other fasteners, upper 102 may be tightened around a foot with a minimal amount of effort from a user. Examples of automatic lacing systems are disclosed in the automatic lacing system case.

In some embodiments, upper 102 may include individual tightening systems associated with different portions of upper 102. In this exemplary embodiment, upper 102 may include automatic lacing system 122 that is associated with arch portion 130 of upper 102. Likewise, upper 102 may include automatic ankle cinching system 124 that is associated with ankle portion 132 of upper 102. As previously discussed, in an exemplary embodiment, automatic lacing system 122 and automatic ankle cinching system 124 may be configured to automatically tighten and/or loosen upper 102 around an arch of a foot and an ankle of a foot. In other cases, however, manual lacing systems and/or manual ankle cinching systems can be used.

Automatic lacing system 122 preferably includes a plurality of straps. The term strap as used throughout this detailed description and in the claims refers to any device that can be used for tightening a portion of an article of footwear to a foot. Generally, a strap could have any shape. In some embodiments, a strap could have a rectangular or ribbon-like shape. However, it should be understood that the term strap is not intended to be restricted to tightening devices with ribbon-like shapes. In other embodiments, for example, a strap could have a lace-like shape. In still other embodiments, automatic lacing system 122 could be associated with other types of fasteners. Examples of other fasteners that could be used with automatic lacing system 122 include, but are not limited to, laces, cords and strings.

Additionally, a strap could be made of any material. Examples of materials that could be used include, but are not limited to, leather, natural fabric, synthetic fabric, metal, rubber, as well as other materials. In some embodiments, a strap could be any type of woven strap as well. In particular, a strap could be woven from any material known in the art for producing woven straps.

Generally, automatic lacing system 122 can include any number of straps. In some embodiments, only a single strap may be provided. In other embodiments, multiple straps may be provided. In this embodiment, automatic lacing system 122 includes four straps, including first strap 111, second strap 112, third strap 113 and fourth strap 114. For clarity, first strap 111, second strap 112, third strap 113 and fourth strap 114 may be referred to collectively as strap set 115.

In this embodiment, strap set 115 is disposed beneath lacing gap 107 of upper 102. In some cases, strap set 115 may be configured to adjust the size of lacing gap 107. As the size of lacing gap 107 is adjusted, the sidewall portions of upper 102 may move closer together or further apart. With this arrangement, as strap set 115 is adjusted, upper 102 can be opened and/or closed around the arch of a foot.

Generally, strap set 115 may be arranged in any direction on upper 102. In some embodiments, strap set 115 could extend in a generally longitudinal direction. Preferably, strap set 115 may be arranged in a lateral direction with respect to upper 102. The term "lateral direction" as used in this detailed description and in the claims refers to a direction extending from a medial side of upper 102 to a lateral side of upper 102. In other words, the lateral direction preferably extends along the width of upper 102.

Furthermore, strap set 115 may include any type of spacing between adjacent straps. In some embodiments, the spacing between adjacent straps could vary. In other embodiments, one or more straps may cross over, or intersect with, one another. In a preferred embodiment, the straps of strap set 115 may be substantially evenly spaced. In particular, the width between adjacent portions of two straps remains substantially constant. In other words, the straps may be approximately parallel at adjacent portions.

Although automatic lacing system 122 is configured to tighten and/or loosen upper 102 at arch portion 130 in the current embodiment, in other embodiments, automatic lacing system 122 could be associated with another portion of upper 102. For example, in another embodiment, automatic lacing system 122 could be configured to tighten upper 102 at a side portion of upper 102. Additionally, automatic lacing system 122 could be associated with a toe portion of upper 102. In still another embodiment, automatic lacing system 122 could be associated with a heel portion of upper 102.

In some embodiments, automatic lacing system 122 may include provisions for automatically moving strap set 115. In some cases, automatic lacing system 122 may include a strap moving mechanism. The term "strap moving mechanism" as used throughout this detailed description and in the claims refers to any mechanism capable of providing motion to one or more straps without requiring work to be performed by the user. In other words, a strap moving mechanism allows straps to be automatically tightened and/or automatically loosened. Examples of strap moving mechanisms are disclosed in the automatic lacing system case. In some cases, a strap moving mechanism can comprise a motor configured to drive one or more straps of a strap set. For purposes of clarity, no strap moving mechanism is illustrated in this embodiment. However, in some cases, one or more components of a strap moving mechanism can be included with article 100.

Automatic ankle cinching system 124 may include at least one ankle strap. In some embodiments, automatic ankle cinching system 124 may include multiple ankle straps. In this exemplary embodiment, automatic ankle cinching system 124 includes ankle strap 150. Ankle strap 150 could be any type of strap, including any type of strap previously discussed with respect to the straps of automatic lacing system 122. In some embodiments, ankle strap 150 could be a similar type of strap to the straps of strap set 115. In other embodiments, ankle strap 150 could be a different type of strap from the straps of strap set 115.

In some cases, automatic ankle cinching system 124 also includes provisions for receiving a portion of ankle strap 150. In this embodiment, automatic ankle cinching system 124 includes housing 160 that is configured to receive a portion of ankle strap 150. Housing 160 could be located anywhere on ankle portion 132 of upper 102. In some cases, housing 160 could be disposed on a side of ankle portion 132. In other cases, housing 160 could be disposed on at the front of ankle portion 132. In one embodiment, housing 160 may be disposed on a rear portion of ankle portion 132.

In some embodiments, automatic ankle cinching system 124 may include provisions for automatically moving ankle strap 150 between a tightened and loosened position. In some cases, automatic ankle cinching system may include a strap moving mechanism. The term "strap moving mechanism" as used throughout this detailed description and in the claims refers to any mechanism capable of providing motion to one or more straps without requiring work to be performed by the user. In other words, a strap moving mechanism allows straps to be automatically tightened and/or automatically loosened. Examples of strap moving mechanisms are disclosed in the automatic lacing system case. In some cases, a strap moving mechanism for an ankle strap can comprise a spring coil that is configured to automatically tighten the ankle strap, as discussed in the automatic lacing system case. For purposes of clarity, no strap moving mechanism for automatic ankle cinching system 124 is illustrated in this embodiment. However, in some cases, one or more components of a strap moving mechanism for an ankle cinching system can be included with article 100.

An article of footwear may include provisions for illuminating one or more portions of an article. In some cases, portions of an article may be illuminated for decorative purposes. In other cases, portions of an article may be illuminated for purposes of increased safety by facilitating greater visibility of an article during nighttime or low light conditions. In still other cases, portions of an article can be illuminated to signal the activation of one or more automated systems, such as an automatic lacing system.

Referring to FIG. 1, article 100 may include lighting system 200. Lighting system 200 may comprise a plurality of lighting devices. The term "lighting device" as used throughout this detailed description and in the claims refers to any device configured for illumination. In different embodiments, different types of lighting devices can be used including, but not limited to, incandescent bulbs, light emitting diodes (LEDs), florescent lights, high intensity discharge lamps, as well as other types of devices. In some cases, each lighting device may be associated with an illuminated state, also referred to as an "on" state of the device, and a non-illuminated state, also referred to as an "off" state of the device.

In different embodiments, the number of lighting devices comprising lighting system 200 can vary. In some cases, lighting system 200 may comprise a single lighting device. In other cases, lighting system 200 can comprise two or more lighting devices. In one embodiment, lighting system 200 comprises three lighting devices, including first lighting device 202, second lighting device 204 and third lighting device 206. Although the current embodiment first lighting device 202 and second lighting device 204 are disposed on a lateral portion of article 100, in other embodiments article 100 could include additional lighting devices disposed on a medial portion of article 100.

Generally, first lighting device 202 can be disposed on any portion of article 100. In some cases, first lighting device 202 may be disposed on heel portion 210 of sole 104. In particular, first lighting device 202 may be disposed on a peripheral edge of heel portion 210. With this arrangement, first lighting device 202 may illuminate a portion of sole 104. In other cases, first lighting device 202 may be disposed on another portion of article 100.

First lighting device 202 can comprise one or more distinct lighting portions. In some embodiments, first lighting device 202 includes first light emitting portion 222 and second light emitting portion 224. In one embodiment, first light emitting portion 222 and second light emitting portion 224 can have curved shapes. In particular, first light emitting portion 222 and second light emitting portion 224 can be approximately tear drop shaped. In other embodiments, however, first light emitting portion 222 and second light emitting portion 224 can have any other type of shape, including, but not limited to, circular shapes, elliptical shapes, rectangular shapes, regular polygonal shapes as well as irregular shapes.

First lighting 202 device can be any type of lighting device. In some cases, first lighting device 202 can be a LED type lighting device. In other cases, first lighting device 202 can be another type of lighting device, such as an electroluminescent panel (ELP). By using an ELP lighting device, first lighting device 202 can provide illumination to sole 104 without excessive power consumption or heating.

Generally, second lighting device 204 may be disposed on any portion of article 100. In some cases, second lighting device 204 may be disposed on a lateral portion of upper 102. In particular, second lighting device 204 may be disposed above heel portion 210 of sole 104. In other cases, second lighting device 204 may be disposed on another portion of article 100.

Second lighting device 204 may be any type of lighting device. In some cases, second lighting device 204 may comprise a plurality of bulbs 230. Furthermore, plurality of bulbs 230 may comprise distinct LED bulbs. In one embodiment, second lighting device 204 comprises three distinct rows of LED bulbs. In some cases, each distinct row of plurality of bulbs 230 may be associated with three distinct colors. In other cases, plurality of bulbs 230 can comprise a single color.

Generally, third lighting device 206 may be disposed on any portion of article 100. In some cases, third lighting device 206 may be disposed on ankle strap 150. In particular, third lighting device 206 may be disposed over lacing gap 107 when ankle strap 150 is in a closed or tightened position. With this arrangement, third lighting device 206 may be oriented in a direction towards a forefoot of article 100. Furthermore, this arrangement increases the visibility of third lighting device 206 since a user can simply look down at the front of an article to see third lighting device 206.

Third lighting device 206 may be any type of lighting device. In some cases, third lighting device 206 may be a LED type device. In other cases, third lighting device 206 can comprise any other type of lighting device. In one embodiment, third lighting device 206 may include an indicia of some kind. Examples of indicia that could be used include graphics, text, numbers or other types of indicia. In this exemplary embodiment, third lighting device 206 comprises logo 250. This arrangement allows a manufacturer to decorate article 100 using a logo or some other type of indicia. In an alternative embodiment, for example, third lighting device 206 may include the numbers of players on a sports team.

Article 100 may include provisions for operating one or more lighting devices. In some cases, lighting system 200 can include components for powering one or more lighting devices. In other cases, lighting system 200 can include components for controlling the illumination of one or more lighting devices. In an exemplary embodiment, lighting system 200 can include components for powering and controlling one or more lighting devices.

Figure 2:
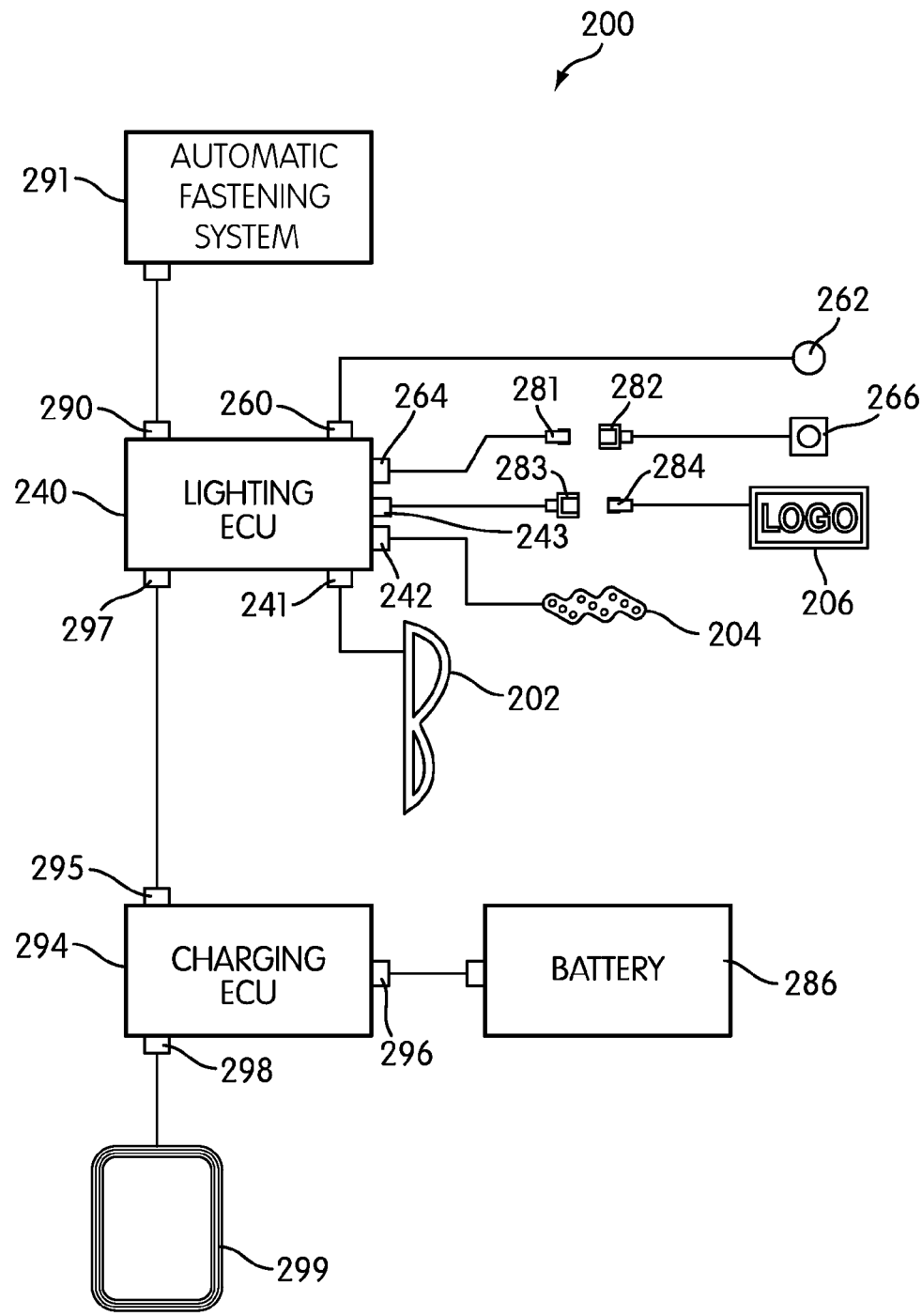
FIG. 2 is a schematic view of an embodiment of components of a lighting system.
Figure 3:
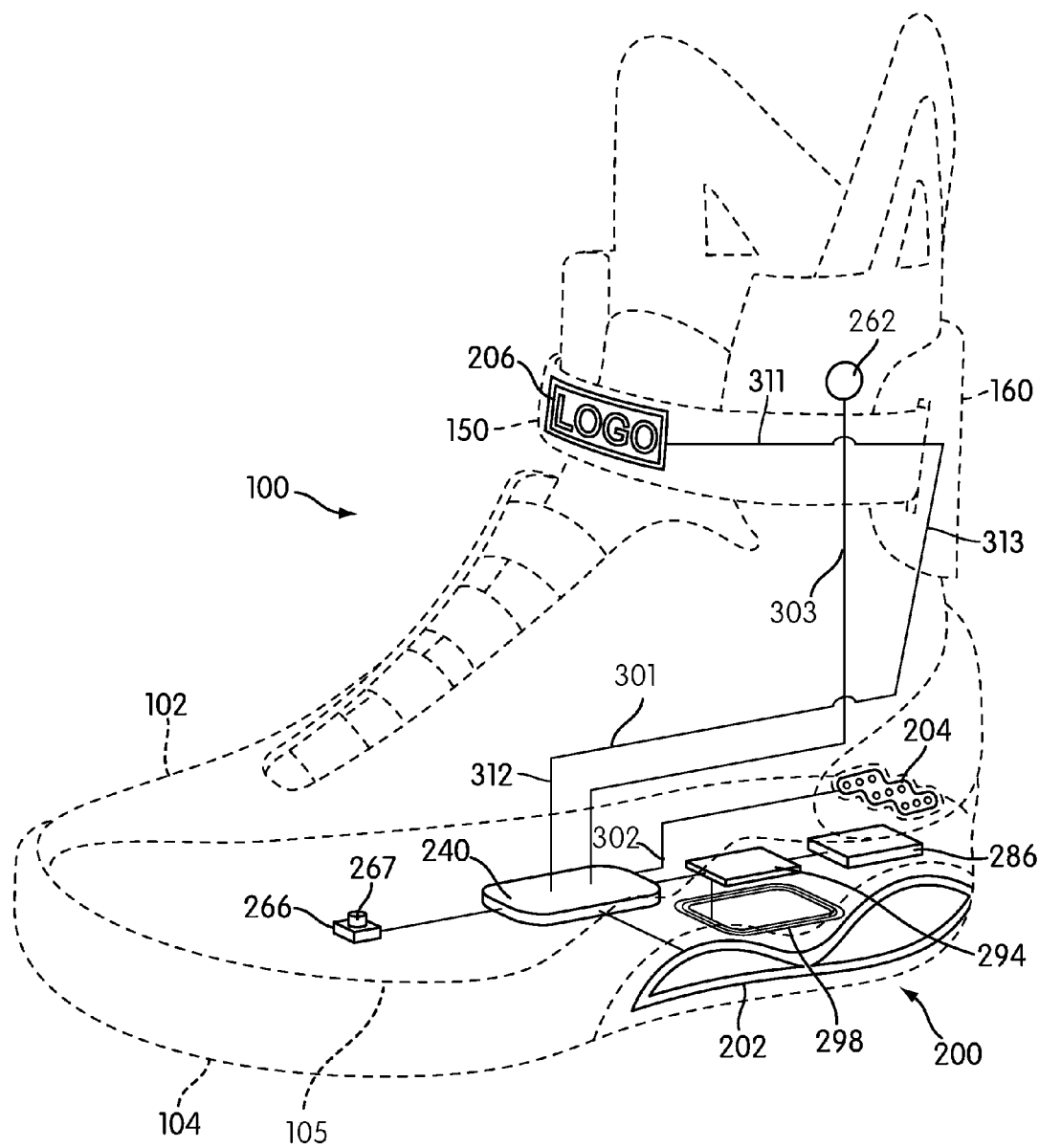
FIG. 3 is an isometric view of an embodiment of an article of footwear with a lighting system.

FIG. 2 illustrates a schematic view of an embodiment of lighting system 200. FIG. 3 illustrates an isometric view of article 100 including lighting system 200. For purposes of clarity, article 100 is shown in phantom in FIG. 3 to illustrate the locations of various components of lighting system 200. Referring to FIGS. 2 and 3, lighting system 200 may include lighting electrical control unit 240, hereby referred to as lighting ECU 240. Generally, lighting ECU 240 may be any type of ECU. For example, in some embodiments, an ECU could be a central processing unit (CPU) of some kind. In other embodiments, an ECU could be a simple circuit of some kind for receiving electrical inputs and providing an electrical output according to the inputs. In one embodiment, lighting ECU 240 may be a printed circuit board.

Lighting ECU 240 may include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with lighting ECU 240 are optional. Some embodiments may include a given port or provision, while others may exclude it. The following description discloses many of the possible parts and provisions that can be used, however, it should be kept in mind that not every part or provision must be used or included in a given embodiment.

Referring to FIG. 2, lighting ECU 240 can include provisions for transferring information and/or power with one or more lighting devices. In some cases, lighting ECU 240 can include first lighting device port 241, second lighting device port 242 and third lighting port 243 that are configured to transfer information and/or power to first lighting device 202, second lighting device 204 and third lighting device 206, respectively. With this arrangement, lighting ECU 240 can control the operation of first lighting device 202, second lighting device 204 and third lighting device 206. In particular, lighting ECU 240 can turn each lighting device on or off, as well as provide power for operating each lighting device.

Lighting ECU 240 can also include provisions for switching one or more lighting devices between an illuminated state and a non-illuminated state. In other words, lighting ECU 240 can include provisions for turning each lighting device on or off. In some embodiments, lighting ECU 240 can include provisions for manually operating one or more lighting devices. In other embodiments, lighting ECU 240 can include provisions for automatically operating one or more lighting devices. In still other embodiments, lighting ECU 240 can simultaneously include both manual and automatic provisions for operating one or more lighting devices.

In one embodiment, lighting ECU 240 can include manual switch port 260 that is configured to transfer and/or receive information from manual switch 262. Also, lighting ECU 240 can include pressure switch port 264 that is configured to transfer and/or receive information from pressure switch 266. Using manual switch 262 and/or pressure switch 266 allows for direct control of lighting system 200. Although the current embodiment includes two switches, in other embodiments, only a single switch may be used. In still other embodiments, no switches may be used. In still other embodiments, more than two switches may be used.

In some cases, one or more devices may be connected to lighting ECU 240 via removable connectors. For example, in one embodiment, a circuit connecting third lighting device 206 with third lighting device port 243 can include first plug 284 and first connector 283. In some cases, first plug 284 may be a 2 pin plug. Likewise, in some cases, first connector 283 may be a 2 pin connector. With this arrangement, third lighting device 206 can easily be attached and/or detached from lighting ECU 240. This allows a manufacturer to easily interchange third lighting device 206, which may contain logos or other types of indicia.

In one embodiment, a circuit connecting pressure switch 266 and lighting ECU 240 may include second plug 281 and second connector 282. In some cases, second plug 281 can be a 2 pin plug. Also, in some cases, second connector 282 can be a 2 pin connector. With this arrangement, pressure switch 266 can easily be attached and/or detached from lighting ECU 240. This allows a manufacturer to easily add or remove a pressure switch as an option for operating lighting system 200.

It should be understood that the use of removable connectors is optional. Although the current embodiment includes two circuits comprising plugs and connectors, in other embodiments, any devices attached to lighting ECU 240 can comprise one or more removable connectors. In other embodiments, none of the circuits may include removable connectors.

In embodiments where an article includes an automatic fastening system for adjusting laces, straps, or other fastening devices, a lighting system can include provisions for communicating with the automatic fastening system. In some cases, an automatic fastening system can comprise an automatic lacing system. In other cases, an automatic fastening system can comprise an automatic ankle cinching system. In still other cases, an automatic fastening system can include both an automatic lacing system and an automatic ankle cinching system.

In one embodiment, lighting ECU 240 can include fastening system port 290 that is configured to transfer and/or receive information automatic fastening system 291. With this arrangement, lighting ECU 240 can communicate with an automatic fastening system. For example, in some cases, a lighting system can be configured to turn on one or more lighting devices once an automatic fastening system has tightened an article to the foot of a user. Likewise, in some cases, a lighting system can be configured to turn off one or more lighting devices once an automatic fastening system has been loosened. It will be understood that automatic fastening system 291 is optional and may not be included in some embodiments.

An article with a lighting system can also include provisions for powering the lighting system. Generally, lighting system 200 may be associated with an electrical power source of some kind. In some cases, lighting system 200 could be associated with an external battery. In still other cases, lighting system 200 could include an internal battery. In an exemplary embodiment, lighting system 200 may be configured to receive power from internal battery 286. Battery 286 could be any type of battery. In some embodiments, battery 286 could be a disposable battery. Examples of different types of disposable batteries include, but are not limited to, zinc-carbon, zinc-chloride, alkaline, silver-oxide, lithium disulfide, lithium-thionyl chloride, mercury, zinc-air, thermal, water-activated, nickel oxyhydroxide, and paper batteries. In this exemplary embodiment, battery 286 could be a rechargeable battery of some kind. Examples of rechargeable batteries include, but are not limited to nickel-cadmium, nickel-metal hydride and rechargeable alkaline batteries.

In embodiments including a rechargeable battery, a lighting system can include provisions for charging the battery. In one embodiment, lighting system 200 may include charging electrical control unit 294, hereby referred to as charging ECU 294. Generally, charging ECU 294 may be any type of ECU. For example, in some embodiments, an ECU could be a central processing unit (CPU) of some kind. In other embodiments, an ECU could be a simple circuit of some kind for receiving electrical inputs and providing an electrical output according to the inputs. In one embodiment, charging ECU 294 may be a printed circuit board.

Charging ECU 294 may include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

In some embodiments, charging ECU 294 can include battery port 296 that is configured to transfer power to and from battery 286. Additionally, charging ECU 294 can include charging port 298 that is configured to transfer power to and from a charging device. Any known charging device in the art could be used. Examples of different types of charging devices include, but are not limited to, simple chargers, trickle chargers, timer-based chargers, intelligent chargers, fast chargers, pulse chargers, USB-type chargers, inductive chargers, as well as other types of charging devices. In an exemplary embodiment, an article of footwear can be associated with an inductive charging system. Since articles of footwear are typically worn in various conditions, including wet conditions, this inductive charging arrangement can help protect the charging circuit from exposure to the elements. In particular, because inductive charging systems do not require exposed electrodes, this arrangement can help prevent short circuiting and/or rusting that might otherwise occur with exposure to water.

In this exemplary embodiment, charging port 298 can be connected to internal charging coil 299. In some cases, internal charging coil 299 may be part of a pair of inductive charging coils. Using an external charging coil, which may be attached to a power source such as a wall socket, the two coils can be coupled to transfer power, via induction, to battery 286. Details of one embodiment of an induction charging system are discussed later in the detailed description.

In one embodiment, charging ECU 294 can also be connected to lighting ECU 240 using first ECU port 295 and second ECU port 297. In some cases, first ECU port 295 and second ECU port 297 can be used to transfer power and/or information between charging ECU 294 and lighting ECU 240. Although the current embodiment includes two different ECUs for a lighting system and for a charging system, other embodiments may only include a single ECU. For example, in another exemplary embodiment, charging ECU 294 and lighting ECU 240 can be combined into a single ECU that controls a charging system and a lighting system of an article of footwear.

In different embodiments, the location of one or more ECUs can vary. In the exemplary embodiment, charging ECU 294 and lighting ECU 240 are disposed in sole 104. In other embodiments, however, charging ECU 294 and lighting ECU 240 could be disposed in another portion of article 100. For example, in another exemplary embodiment, charging ECU 294 and/or lighting ECU 240 could be disposed in housing 160, which is disposed in ankle portion 132 of upper 102.

In different embodiments, the locations of various components comprising a lighting system can vary. In some cases, some components can be disposed in an upper of an article. In other cases, some components can be disposed in a sole of an article. In an exemplary embodiment, some of the components of a lighting system are disposed on an upper and some of the components are disposed on a sole.

FIG. 3 illustrates an exemplary embodiment of article 100, including some of the components of lighting system 200. For purposes of clarity, each of the components of lighting system 200 is shown schematically. Also, article 100 is shown in phantom in order to reveal the internal structure of article 100. Furthermore, the locations of the components shown in this embodiment are only intended to be exemplary. In other embodiments, the locations of one or more components can be changed. Also, the orientations of each component can vary from one embodiment to another.

As previously discussed, in some embodiments, first lighting device 202 can be disposed on sole 104. Additionally, second lighting device 204 and third lighting device 206 can be disposed on upper 102. In particular, third lighting device 206 can be disposed on ankle strap 150 of upper 102. Furthermore, in some cases, manual switch 262 can be disposed on upper 102. In one embodiment, manual switch 262 may be disposed on an ankle region of upper 102. Generally, however, the locations of one or more of these components can vary. In other embodiments, manual switch 262 can be disposed on any other portion of upper 102 or of sole 104. For example, in another embodiment, manual switch 262 could be disposed on the heel of upper 102.

In some embodiments, an article can include provisions for protecting one or more components of a lighting system from direct exposure to the elements. Additionally, an article can include provisions for reducing direct contact between the components of a lighting system and a foot.

Referring to FIG. 3, the internal components of lighting system 200 are clearly visible within article 100. In some embodiments, one or more components of lighting system 200 can be disposed within sole 104. In one embodiment, lighting ECU 240, charging ECU 294, battery 286, and internal charging coil 298 are disposed within sole 104. In some cases, sole 104 may be a hollow sole with a large internal cavity configured to receive a plurality of components. In other cases, sole 104 can be configured with one or more cavities or recesses that correspond to each individual component. In still other cases, a plurality of components of lighting system 200 could be embedded in a matrix material disposed within a larger cavity of sole 104. For example, an internal cavity of sole 104 could be filled with foam that surrounds each of the various components.

The current embodiment illustrates various components of lighting system 200 arranged in a substantially similar plane of sole 104. In other embodiments, however, one or more components could be stacked in a substantially vertical direction within sole 104. For example, in another exemplary embodiment lighting ECU 240 can be stacked over charging ECU 294 in a substantially vertical direction to provide a more compact arrangement within sole 104.

In different embodiments, the location of pressure switch 266 can vary. In some cases, pressure switch 266 can be disposed on a portion of upper 102. In other cases, pressure switch 266 can be disposed in a portion of sole 104. In an exemplary embodiment, pressure switch 266 can be disposed on a top surface of sole 104. In particular, button 267 can be configured to extend outwards from top surface 105 of sole 104. In some cases, pressure switch 266 can be disposed within a forefoot portion of sole 104. In other cases, pressure switch 266 can be disposed in an arch portion or a heel portion of sole 104. With this arrangement, button 267 can be depressed as a foot is inserted into article 100.

For purposes of clarity, article 100 is shown in the current embodiment without an insole. In some embodiments, however, article 100 can include an insole disposed between upper 102 and sole 104. In some cases, the insole can rest on top surface 105 of sole 104. In embodiments including a pressure switch, the insole may rest over the pressure switch. In these embodiments, as a foot is inserted into upper 102, the insole may be pushed downwards, which may cause the pressure switch to depress.

Lighting system 200 can include provisions for protecting wires used to connect components disposed on upper 102 with components disposed on sole 104. In one embodiment, third lighting device 206 can be connected to lighting ECU 240 via first wire 301. In some cases, first wire 301 may further comprise first end portion 311 that extends through a portion of ankle strap 150. In particular, first end portion 311 may be threaded through a portion of ankle strap 150. Additionally, first wire 301 may comprise second end portion 312 that extends through a portion of upper 102. In particular, second end portion 312 may be threaded through a portion of upper 102. In some cases, for example, second end portion 312 can be disposed between an inner and outer lining of upper 102. Finally, first wire 301 may comprise intermediate portion 313, which extends between first end portion 311 and second end portion 312. In some embodiments, intermediate portion 313 may be disposed in a portion of housing 160. With this arrangement, first wire 301 can be protected from the elements as well as from contact with a foot and/or external objects.

In some embodiments, first wire 301 may be configured to move with ankle strap 150. In some cases, first wire 301 may comprise a substantially flexible material that can be stretched and/or contracted as third lighting device 206 moves with ankle strap 150. In other cases, first wire 301 may be configured with some slack to allow for motion of third lighting device 206.

In a similar manner, the remaining components of lighting system 200 can also be connected via one or more wires. In particular, one or more components may be connected to lighting ECU by connecting wires to the various ports of ECU 240 that have been previously discussed, and which are illustrated in FIG. 2. For example, second lighting component 204 can be connected to lighting ECU 240 via second wire 302. In some cases, second wire 302 can be embedded in a lining of upper 102. Also, manual switch 266 can be connected to lighting ECU 240 via third wire 303. In some cases, third wire 303 can be embedded in a lining of upper 102. This arrangement helps provide protection for second wire 302 and third wire 303.

For purposes of illustration, the components of lighting system 200 are shown with a particular size in this embodiment. In other embodiments, however, the size of each component can vary. For example, in some cases, the size of battery 286 may vary. In some embodiments, battery 286 could have a length in the range of 10 mm to 50 mm. Furthermore, battery 286 could have a width in the range of 10 mm to 50 mm. In an exemplary embodiment, battery 286 has a width of about 30 mm. Furthermore, battery 286 preferably has a length of about 40 mm. In a similar manner, the sizes of other components of lighting system 200 can vary from one embodiment to another.

Although the current embodiment includes an inductive charging system, other embodiments could include a plug-in type charging system. For example, in one embodiment a USB-based charger may be used. In particular, article 100 can include a charging port that is electrically connected with a battery via an electrical circuit of some kind. Furthermore, the charging port may be configured to connect to an external battery charger of some kind. In still another embodiment, a charging system could be configured with both a physical charging port and an inductive loop that allows the system to operate in a plug-in type charging mode or an inductive-type charging mode.

Figure 4:
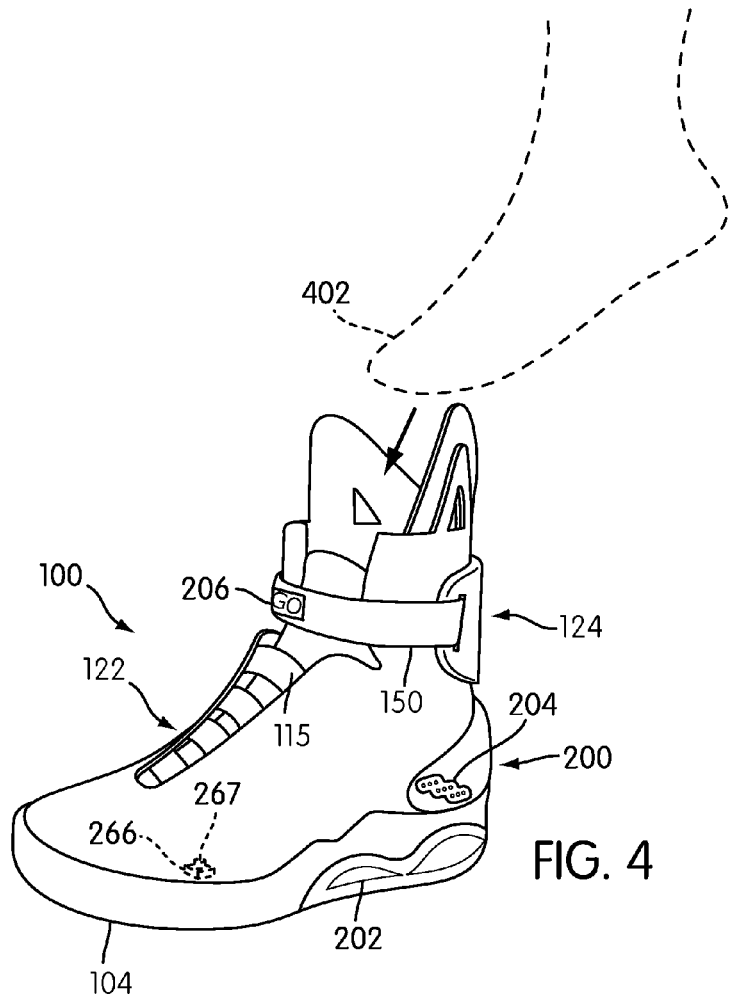
FIG. 4 is an isometric view of an embodiment of an article of footwear with a lighting system prior to insertion of a foot.
Figure 5:
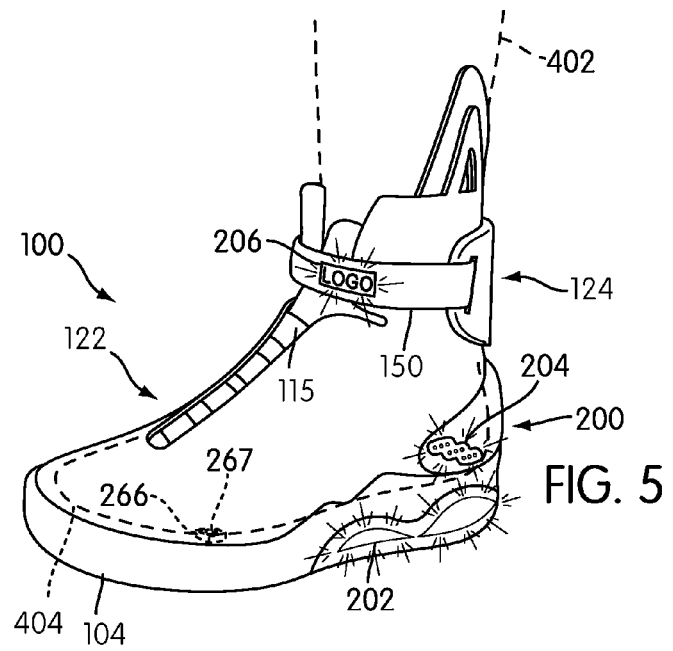
FIG. 5 is an isometric view of an embodiment of an article of footwear with a lighting system after insertion of a foot.

FIGS. 4 through 8 are intended to illustrate embodiments of article 100, including lighting system 200. As previously discussed, in some embodiments, lighting system 200 may be operated using a manual switch and/or a pressure switch. Referring to FIGS. 4 and 5, article 100 can be operated using a pressure switch in some embodiments. Initially, as seen in FIG. 4, foot 402 may be disposed outside of article 100. At this point, pressure switch 266 may be in an "off" position. In particular, button 267 is fully extended above a top surface of sole 104. With pressure switch 266 in this off position, lighting system 200 may be deactivated. In particular, first lighting device 202, second lighting device 204 and third lighting device 206 may be in a non-illuminate state.

Referring to FIG. 5, as foot 402 is inserted into article 100, forefoot 404 may be disposed against button 267. In some cases, button 267 may be depressed under the pressure of forefoot 404. As button 267 is depressed, pressure switch 266 may be disposed in an "on" position that is associated with the activation of lighting system 200. In particular, with pressure switch 266 depressed, first lighting device 202, second lighting device 204 and third lighting device 206 may be in an illuminated state.

As previously discussed, in some cases, a lighting system can be in communication with an automatic fastening system. In some embodiments, one or more lighting devices may be controlled according to the operating conditions of an automatic fastening system. In some cases, one or more lighting devices may be configured in a non-illuminated state when an automatic fastening system is disposed in a loosened position. Additionally, in some cases, one or more lighting devices may be configured in an illuminated state when an automatic fastening system is disposed in a tightened position.

For example, in this exemplary embodiment, when pressure switch 266 is not depressed, automatic lacing system 122 and automatic ankle cinching system 124 may be in a loosened position, as seen in FIG. 4. As previously discussed, lighting system 200 may be disposed in a non-illuminated state when pressure switch 266 is not depressed. Furthermore, as pressure switch 266 is depressed, automatic lacing system 122 and automatic ankle cinching system 124 may move from a loosened position to a tightened position, as seen in FIGS. 4 and 5. As previously discussed, lighting system 200 is operated in an illuminated position when pressure switch 266 is depressed. In other words, this arrangement couples the operation of lighting system 200 with automatic lacing system 122 and automatic ankle cinching system 124.

With this arrangement, lighting system 200 can be used to indicate when one or more automatic fastening systems have been activated. For example, in this exemplary embodiment a user can be made aware that automatic lacing system 122 and automatic ankle cinching system 124 have been activated by observing the illumination from first lighting device 202, second lighting device 204 and/or third lighting device 206. This arrangement can be useful in situations where the tightening of one or more automatic fastening systems is not easily observed by a user.

In different embodiments, the coupling of a lighting system and an automatic fastening system can be achieved in various ways. In some cases, the lighting system may send control signals to the automatic fastening system so that the two systems operate in a cooperative manner. In other cases, each system may be independently in communication with a switch, such as a pressure switch. In such cases, as the pressure switch is depressed, each system receives information from the pressure switch independently.

It should be understood that in other embodiments, a lighting system may not be coupled with an automatic fastening system. In other words, in some embodiments, a lighting system and a fastening system may operated independently of one another. In still other embodiments, the coupling of a lighting system with an automatic fastening system could be reversed from the current embodiment. In other words, in some other embodiments, a lighting system could be configured to operate in an illuminated state when an automatic fastening system is in a loosened position and the lighting system could be configured to operate in a non-illuminated state when the automatic fastening system is in a tightened position.

It should be understood than in still another embodiment, an article can be provided with a lighting system but not an automatic fastening system. In other words, in some cases the automatic fastening system may be optional. Likewise, in other cases, the lighting system may be optional.

For purposes of clarity, the current embodiment includes only pressure switch 266 and does not include a manual switch. In some embodiments, however, article 100 can include both a pressure switch and a manual switch. In such embodiments, a manual switch can be used to override signals transmitted using a pressure switch. In other words, in some embodiments, a manual switch could be used to deactivate an illumination system even when a foot is inserted and a pressure switch is fully depressed. Likewise, in some embodiments, a manual switch could be used to activate an illumination system even when a foot is not inserted and a pressure switch is not depressed.

Figure 6:
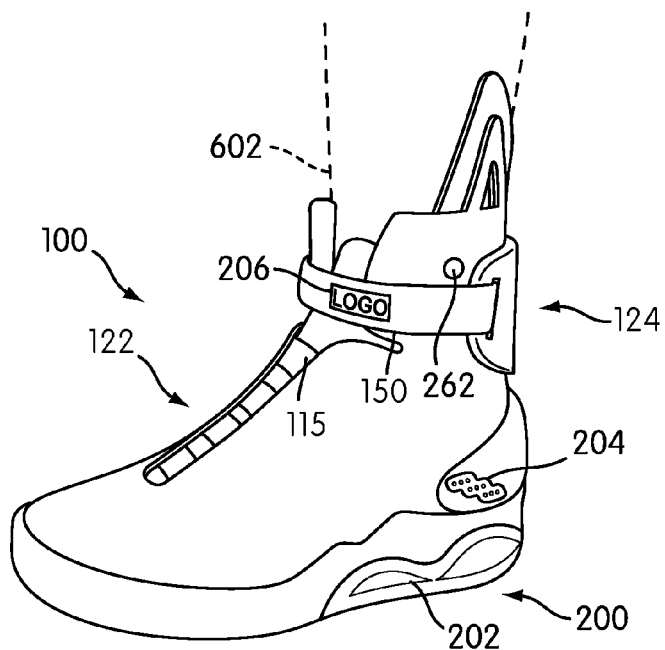
FIG. 6 is an isometric view of an embodiment of an article of footwear with a lighting system before a manual switch has been depressed.
Figure 7:
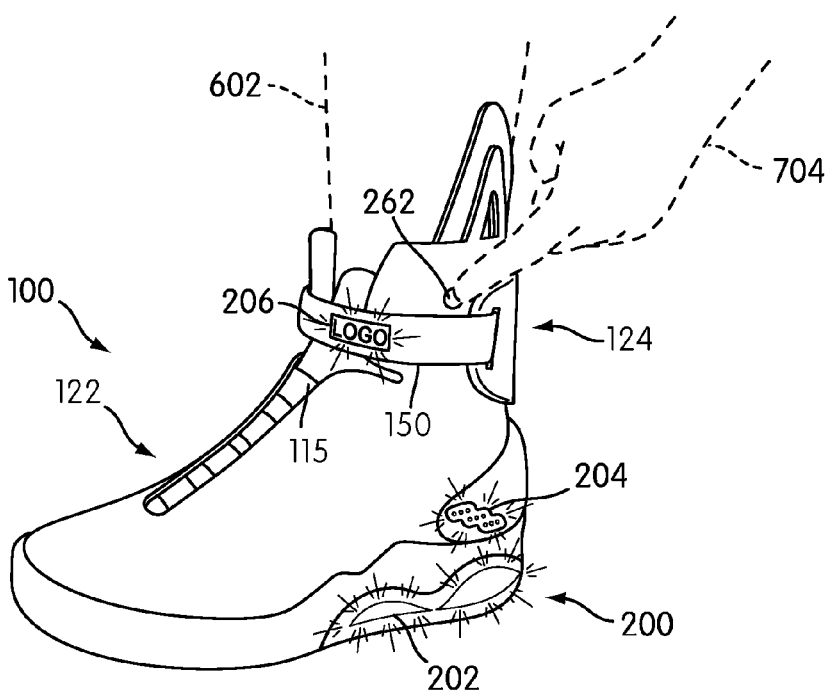
FIG. 7 is an isometric view of an embodiment of an article of footwear with a lighting system after a manual switch has been depressed.

Referring to FIGS. 6 and 7, article 100 can be operated using manual switch 262. Initially, as seen in FIG. 6, foot 602 can be disposed within article 100. At this point, manual switch 262 may be disposed in an "off" position. In other words, lighting system 200 is deactivated so that first lighting device 202, second lighting device 204 and third lighting device 206 are not illuminated. Referring to FIG. 7, user 704 may engage manual switch 262 so that manual switch 262 is disposed in an "on" position. At this point, lighting system 200 may be activated. In particular, first lighting device 202, second lighting device 204 and third lighting device 206 may be illuminated. With this arrangement, a user can have control over when lighting system 200 is activated or deactivated.

In one embodiment, a manual switch may be a button that can be depressed. In other embodiments, however, any type of user controlled device can be used. The term "user controlled device" refers to any device that is configured to receive input directly from a user. Examples of other user controlled devices that may be used include but are not limited to, levers, switches, dials, consoles or other user controlled devices.

In embodiments including one or more automatic fastening systems, manual switch 262 can be used to control lighting system 200 independently of the automatic fastening systems. In other embodiments, however, one or more automatic fastening systems could be simultaneously controlled using manual switch 262. For example, in one embodiment, automatic lacing system 122 and automatic ankle cinching system 124 can be configured to tighten and/or loosen strap set 115 and ankle strap 150, respectively, when manual switch 266 is depressed. With this arrangement, a user can control both a lighting system and an automatic fastening system using a manual switch.

Although the embodiments discussed here include a pressure switch and a manual switch, other embodiments could include any other types of switches or sensors that could be used with a lighting system. Examples of different types of sensors that may be used include, but are not limited to, weight sensors, light sensors, audio sensors, heat sensors, voice activated sensors as well as other types of sensors. For example, in an alternative embodiment, a lighting system could be configured to receive information from a heat sensor. In this case, as a foot is inserted into an upper, the heat sensor may transmit information to the lighting system to illuminate one or more lighting devices.

In some embodiments, a pair of footwear can be associated with a housing for storing the articles of footwear. In embodiments including a charging system, the housing can include provisions for charging. In particular, in embodiments including an inductive charging system, the housing can provide components of the inductive charging system that allow power to be transferred from an external power source to the articles of footwear.

FIGS. 8 through 12 illustrate footwear housing 800 for a pair of footwear. For purposes of clarity, footwear housing 800 is illustrated with a particular design. In particular, footwear housing 800 is illustrated as a footwear bag which resembles a traditional duffle-type bag. Additionally, footwear housing 800 has a size that is configured to fit a single pair of footwear. In other embodiments, however, footwear housing 800 could have any other design. In particular, footwear housing 800 could have another shape and/or size in other embodiments. Examples of other designs for a footwear housing include, but are not limited to, any type of bags and/or back packs. Furthermore, the footwear housing could including any provisions for carrying the housing, including any type of strap or handle.

Figure 8:
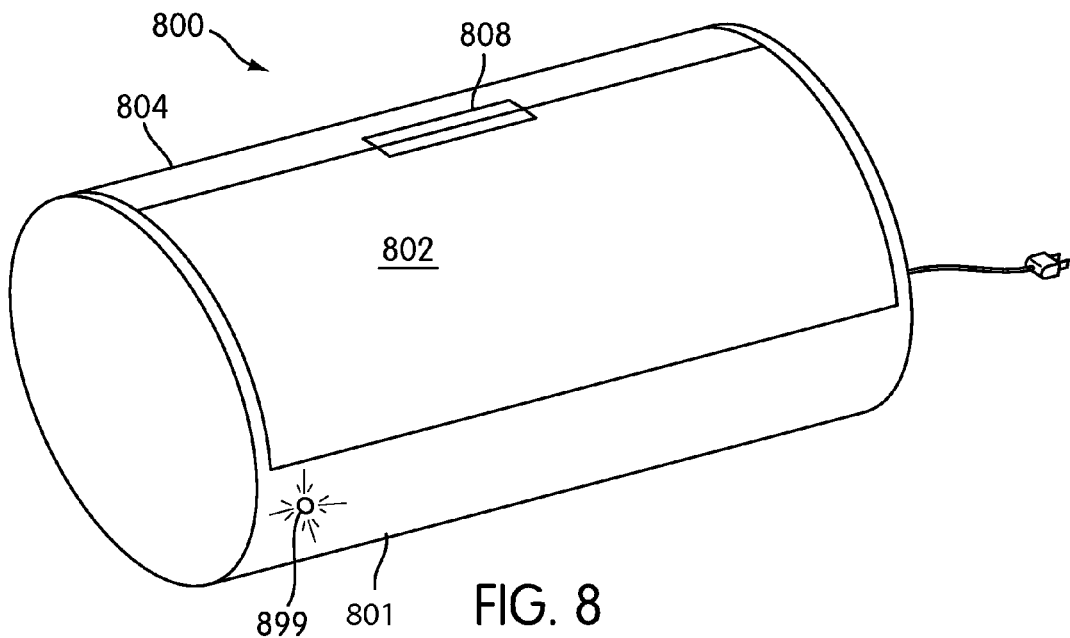
FIG. 8 is an isometric view of an embodiment of a footwear housing.

Referring to FIG. 8, footwear housing 800 includes base portion 801. Furthermore, footwear housing 800 may include first panel 802 and second panel 804. In some cases, first panel 802 and second panel 804 may be movable panels that are configured to open in order to provide access to the interior of footwear housing 800. In one embodiment, first panel 802 and second panel 804 may be adjusted using handle 808. In some embodiments, handle 808 can include provisions for temporarily locking first panel 802 and second panel 804 in a closed position.

In some embodiments, footwear housing 800 can include provisions for indicating the status of a charging system associated with footwear housing 800. In some cases, footwear housing 800 can include a visual indicator, such as a light, for indicating the charging status. In other cases, footwear housing 800 can include a sound-based indicator, such as a speaker configured to produce a sound to indicate the charging status. In this exemplary embodiment, footwear housing 800 can include charging indicator light 899. In particular, charging indicator light 899 may be an LED light that is lit to indicate the charging status of an article of footwear.

Figure 9:
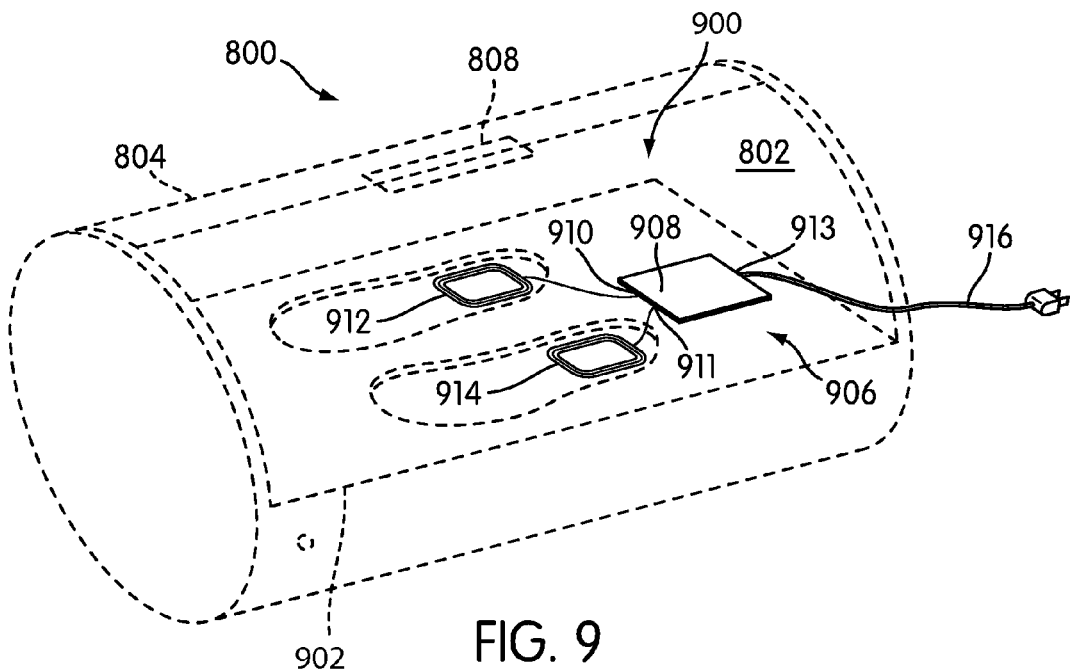
FIG. 9 is an isometric view of an embodiment of a footwear housing including a charging station.

Referring to FIG. 9, footwear housing 800 may include interior portion 900 that is configured to receive one or more articles of footwear. In some embodiments, footwear housing 800 also includes floor portion 902 that provides a floor for interior portion 900. In some cases, floor portion 902 may be rounded. In other cases, floor portion 902 may be substantially flat. With this arrangement, articles placed within footwear housing 800 may rest upon floor portion 902 in a stable manner.

Footwear housing 800 can include one or more components of a charging system. In one embodiment, footwear housing 800 can include charging station 906. In some cases, charging station 906 may include provisions for transferring power to one or more articles of footwear.

In some embodiments, charging station 906 can include charging station ECU 908. Generally, charging station ECU may be any type of ECU. For example, in some embodiments, an ECU could be a central processing unit (CPU) of some kind. In other embodiments, an ECU could be a simple circuit of some kind for receiving electrical inputs and providing an electrical output according to the inputs. In one embodiment, charging station ECU 908 may be a printed circuit board.

Charging station ECU 908 may include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

In one embodiment, charging station ECU 908 can include first port 910 that is configured to transfer power to first external inductive loop 912. Likewise, in some cases, charging station ECU 908 can include second port 911 that is configured to transfer power to second external inductive loop 914. In some cases, each external inductive loop may be associated with an internal inductive loop of a corresponding article of footwear.

Charging station 906 can also include provisions for receiving power from an external power source of some kind. In some embodiments, charging station ECU 908 can include third port 913 that is configured to receive power from an external power source. For example, in an exemplary embodiment, third port 913 can be associated with power cord 916 that can be plugged into a wall socket.

Figure 10:
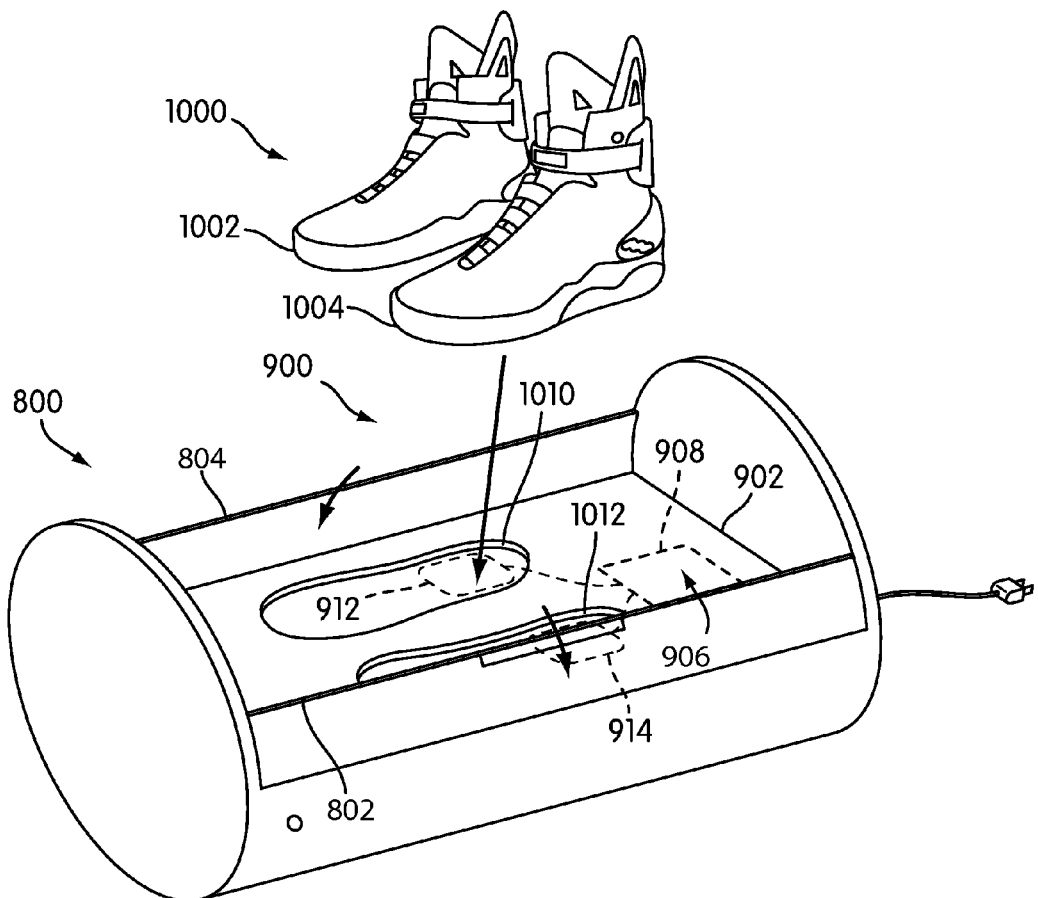
FIG. 10 is an isometric view of an embodiment of a footwear housing in an open position.

Referring to FIG. 10, first panel 802 and second panel 804 of footwear housing 800 have been opened to reveal interior portion 900. As seen in FIG. 10, components of charging station 906 may be disposed below floor portion 902. With this arrangement, the components of charging station 906 can be protected from the elements and from various types of contact with one or more articles of footwear. In other embodiments, however, one or more portions of charging station 906 may be exposed within interior portion 900.

Figure 11:
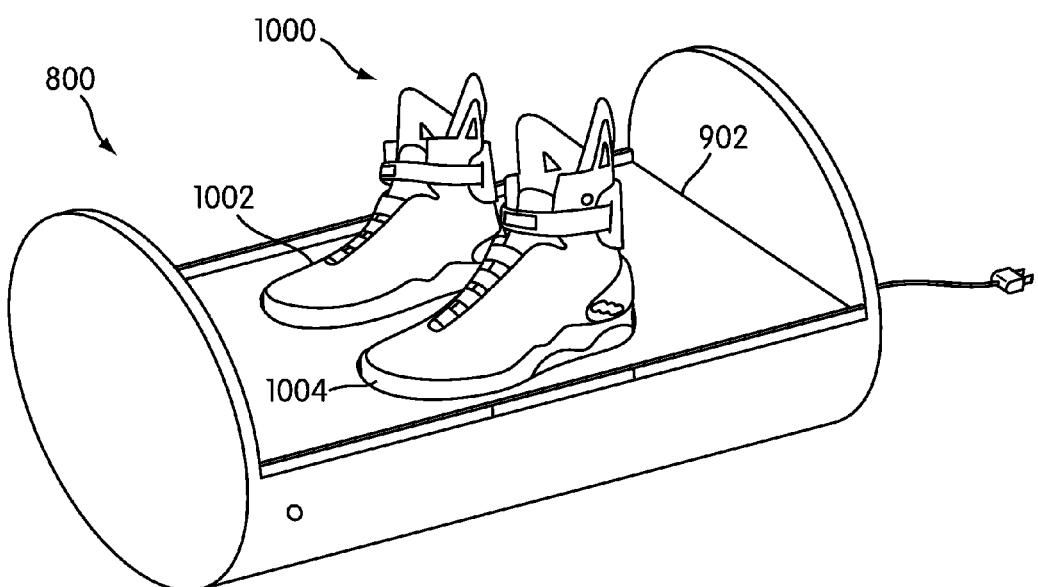
FIG. 11 is an isometric view of an embodiment of a footwear housing receiving a pair of footwear.

In this exemplary embodiment, footwear pair 1000 is inserted into footwear housing 800, as seen in FIGS. 10 and 11. Footwear pair 1000 may comprise first article 1002 and second article 1004. In some cases, floor portion 902 can include one or more locating features to facilitate alignment of footwear pair 1000 with charging station 906. In particular, in embodiments using an inductive charging system, it may be necessary to ensure proper alignment of internal inductive loops disposed within each article with external inductive loops disposed in footwear housing 800.

In this embodiment, floor portion 902 includes first recessed portion 1010 and second recessed portion 1012 that correspond with first article 1002 and second article 1004, respectively. In some cases, first recessed portion 1010 and second recessed portion 1012 may be shaped to fit the bottom surfaces of first article 1002 and second article 1004, respectively. This arrangement can help ensure proper alignment between footwear pair 1000 and charging station 906, which can facilitate efficient charging.

It should be understood that in other embodiments, other types of locating features may be used. For example, in some cases, floor portion 902 can be configured with recesses that engage protrusions located on bottom surfaces of first article 1002 and second article 1004. In other cases, floor portion 902 can be configured with protrusions that engage recesses located on bottom surfaces of first article 1002 and second article 1004. In still other embodiments, other types of locating features that are known in the art can be used.

Figure 12:
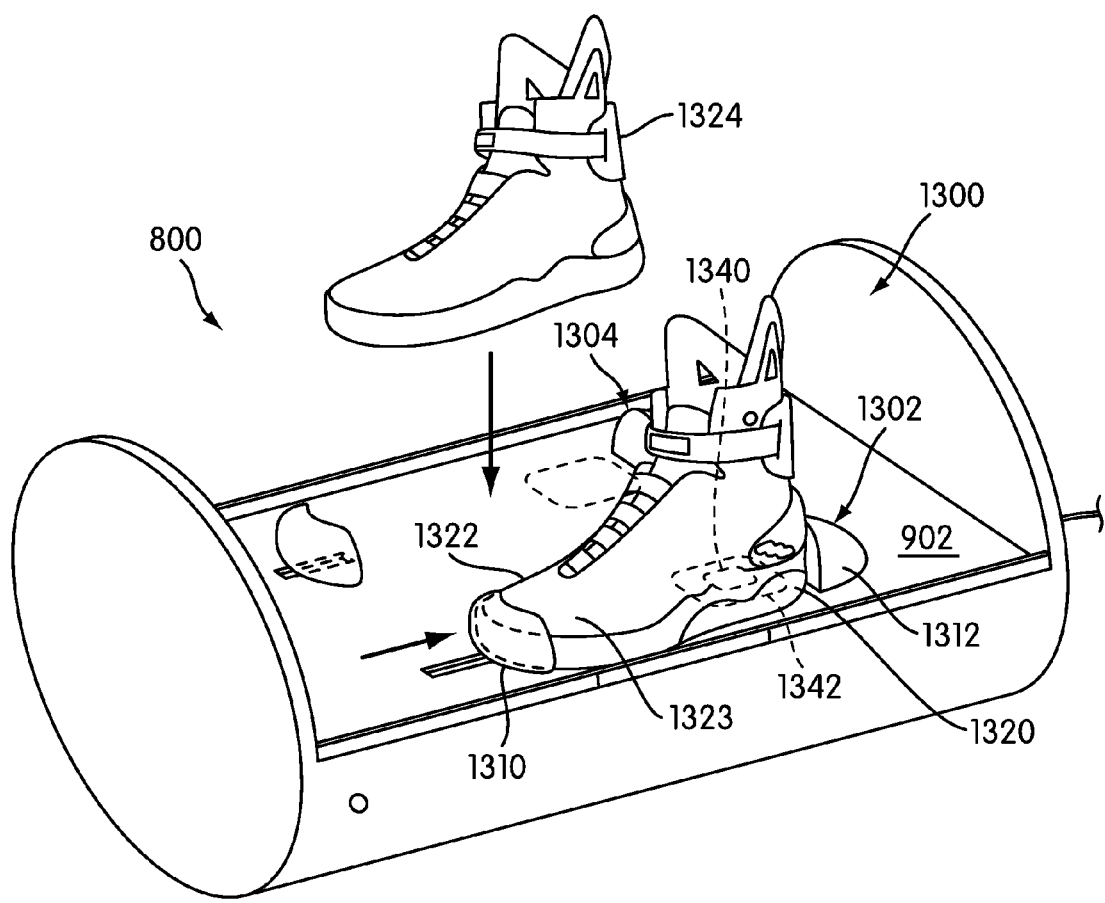
FIG. 12 is an isometric view of an embodiment of a footwear housing receiving a pair of footwear.
Figure 13:
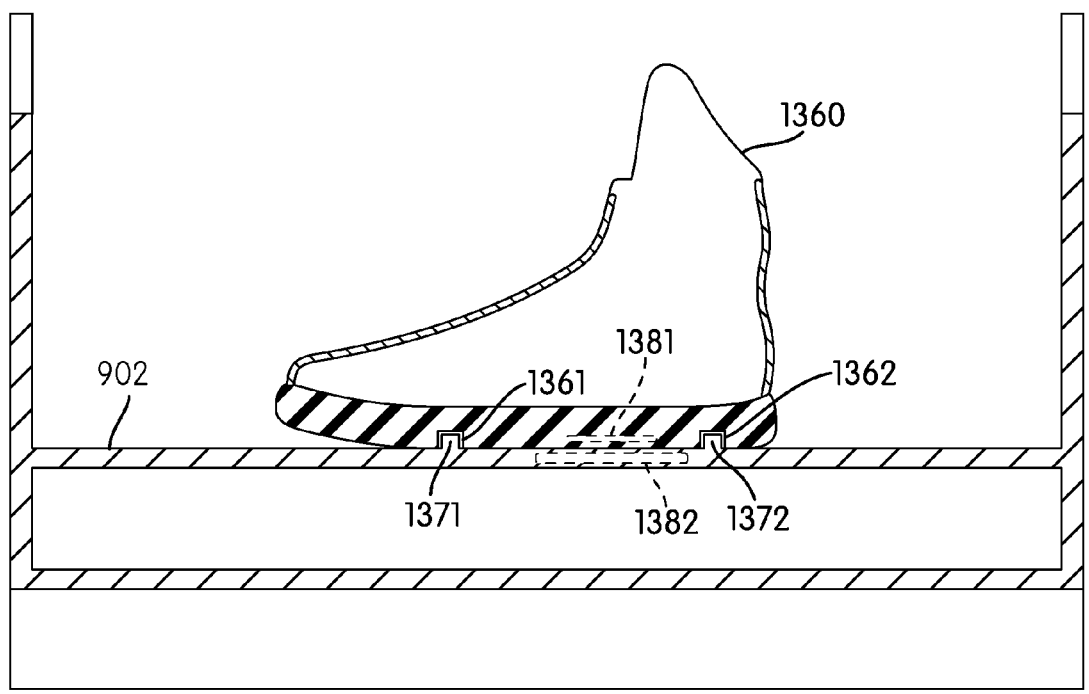
FIG. 13 is a side cross sectional view of an embodiment of a footwear housing with an article of footwear.

FIGS. 12 and 13 illustrate additional embodiments of provisions for ensuring proper alignment between a pair of footwear and a charging station. Referring to FIG. 12, footwear housing 800 can include adjustable bindings 1300. In particular, adjustable bindings 1300 may include first adjustable binding 1302 and second adjustable binding 1304. In some cases, first adjustable binding 1302 includes toe member 1310 and heel member 1312.

Heel member 1312 may be fixed in place with respect to floor portion 902. In contrast, toe member 1310 may be configured to slide in a longitudinal direction with respect to floor portion 902. In this exemplary embodiment, heel portion 1320 of first article 1322 may confront heel member 1312. Furthermore, toe member 1310 may be adjusted to confront toe portion 1323. With this arrangement, toe member 1310 and heel member 1312 may help maintain first article 1322 in a predetermined location with respect to floor portion 902. In particular, first article 1322 may be positioned in a manner that orients internal inductive loop 1340 of first article 1322 with external inductive loop 1342 of a charging system. In a similar manner, second adjustable binding 1304 may be used to locate and fix second article 1324.

Referring to FIG. 13, some embodiments may include one or more locating features. In this embodiment, article 1360 may include first locating recess 1361 and second locating recess 1362. Likewise, floor portion 902 may include first locating protrusion 1371 and second locating protrusion 1372. First locating recess 1361 may be configured to receive first locating protrusion 1371, while second locating recess 1362 may be configured to receive second locating protrusion 1372. With this arrangement, article 1362 can be located and oriented in a manner that ensures proper alignment between internal inductive loop 1381 of article 1360 and external inductive loop 1382 of a charging system. In some cases, floor portion 902 may include additional locating protrusions configured to insert into recesses in a second article of footwear to facilitate charging of a pair of footwear.

Although the current embodiment includes an external inductive loop disposed in a floor portion of a footwear housing, other embodiments can include external inductive loops disposed in other portions of the footwear housing. In other cases, for example, one or more external inductive loops can be disposed on interior side walls of the footwear housing. Furthermore, while the current embodiment includes internal inductive loops disposed in a sole of an article of footwear, in other embodiments an internal inductive loop could be disposed in any other portion of an article of footwear. Examples of other portions that could house an internal inductive loop include, but are not limited to, a tongue, an upper sidewall, a forefoot portion of an upper, a heel portion of an upper, as well as any other portion of an article of footwear. In some embodiments, the location of an internal inductive loop in an article of footwear can be selected according to the location of an external inductive loop in a footwear housing so that the internal inductive loop can be disposed adjacent to the external inductive loop when the article is inserted into the footwear housing.

Figure 14:
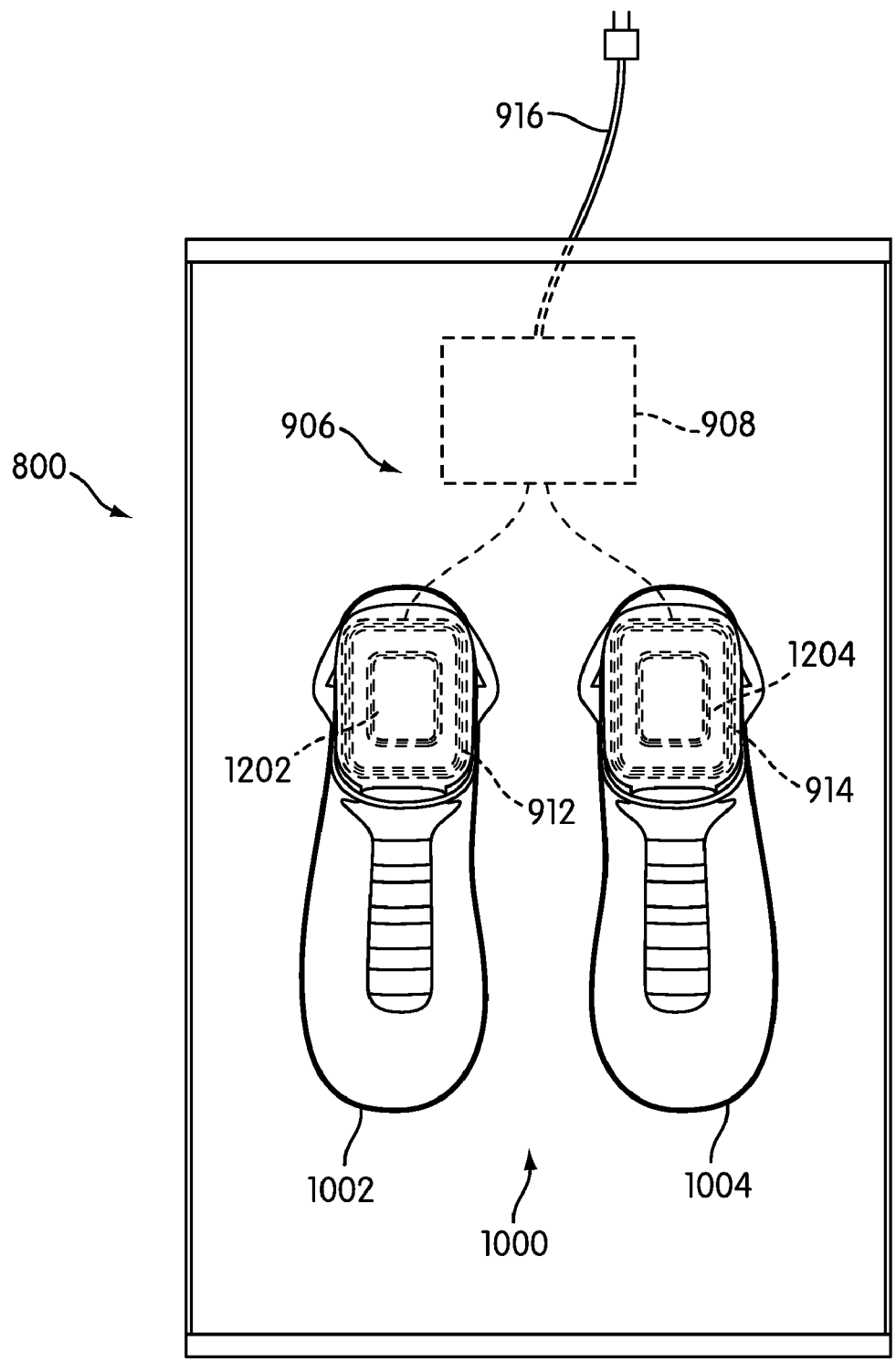
FIG. 14 is a top down view of an embodiment of a pair of footwear coupled with a charging station.

FIG. 14 illustrates a top down view of footwear housing 800 with footwear pair 1000 inserted. Referring to FIG. 14, first internal inductive loop 1202 of first article 1002 may be aligned with first external inductive loop 912. Likewise, second internal inductive loop 1204 of second article 1004 may be aligned with second external inductive loop 914. With this arrangement, power can be efficiently transferred from footwear housing 800 to footwear pair 1000.

In some embodiments, electricity received at an external power source can be transferred to charging station ECU 908 via power cord 916. The electricity can then be transferred to first external inductive loop 912. By using an external power source with an alternating current, power can be inductively transferred between first external inductive loop 912 and first internal inductive loop 1202. In particular, an alternating magnetic field can be created at first external inductive loop 912, which induces a current in first internal inductive loop 1202. This arrangement allows power to be transferred to a rechargeable power source, such as a battery, disposed within first article 1002, which can provide power for a lighting system and/or an automatic fastening system.

In a similar manner, electricity received at charging station ECU 908 can be transferred to second external inductive loop 914. By using an external power source with an alternating current, power can be inductively transferred between second external inductive loop 914 and second internal inductive loop 1204. In particular, an alternating magnetic field can be created at second external inductive loop 914, which induces a current in second internal inductive loop 1204. This arrangement allows power to be transferred to a rechargeable power source, such as a battery, disposed within second article 1004, which can provide power for a lighting system and/or an automatic fastening system.

It will be understood that the charging system discussed in this detailed description and in the claims can be used independently of a lighting system. In particular, since the charging system discussed in this detailed description is used to charge a battery of some kind, that battery can be further coupled to one or more different electrical systems. Generally, the charging system discussed in this detailed description and in the claims may be used to power any type of electrical system associated with an article of footwear. For example, in another embodiment, the charging system discussed in this embodiment could be used to charge a battery to power an accelerometer for tracking distance and motion. In still another embodiment, the charging system discussed here could be used to power a heating and/or cooling system for an article. Furthermore, it will be understood that the charging system could be used to power two or more electrical systems simultaneously.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A footwear housing for an article of footwear, comprising:
    a first panel portion and a second panel portion configured to open to provide access to an interior portion of the footwear housing;
    the interior portion that is being configured to receive the article of footwear;
    a charging ECU associated with a floor portion disposed within the interior portion, the charging ECU being configured to receive power from an external power source;
    an external inductive loop in communication with the charging ECU;
    wherein the external inductive loop is associated with an internal inductive loop of the article of footwear; and
    wherein the footwear housing is sized and dimensioned so as to fit the article of footwear within the interior portion.
2. The footwear housing according to claim 1, wherein the interior portion includes a locating feature configured to facilitate alignment of the article of footwear on the floor portion of the interior portion.

3. The footwear housing according to claim 2, wherein the locating feature facilitates alignment of the external inductive loop with the internal inductive loop of the article of footwear in a manner that facilitates inductive coupling of the article of footwear with the footwear housing.

4. The footwear housing according to claim 1, wherein the external inductive loop is disposed below the floor portion.

5. The footwear housing according to claim 4, wherein the charging ECU is disposed below the floor portion.

6. The footwear housing according to claim 4, wherein the external inductive loop is spaced apart from a lower surface of the article of footwear.

7. The footwear housing according to claim 1, further comprising an adjustable binding disposed within the interior portion; and
   wherein the adjustable binding is configured to maintain the article of footwear in a predetermined location with respect to the floor portion to align the external inductive loop with the internal inductive loop of the article of footwear in a manner that facilitates inductive coupling of the article of footwear with the footwear housing.

8. The footwear housing according to claim 1, wherein the first panel portion and the second panel portion are configured to be moveable between an open position and a closed position.

9. The footwear housing according to claim 1, wherein the footwear housing is configured to transport the article of footwear within the interior portion.

10. A charging system for an article of footwear, comprising:
   a rechargeable power source disposed inside the article of footwear, the rechargeable power source being configured to power a lighting system;
   a footwear housing configured to receive the article of footwear, the footwear housing being associated with an external power source;
   the footwear housing comprising:
   a first panel portion and a second panel portion configured to open to provide access to an interior portion of the footwear housing;
   wherein the footwear housing is sized and dimensioned so as to fit the article of footwear within the interior portion;
   an internal inductive loop disposed inside the article of footwear, the internal inductive loop configured to transfer power to the rechargeable power source;
   an external inductive loop disposed within the interior portion of the footwear housing, the external inductive loop configured to receive power from the external power source; and
   wherein the internal inductive loop and the external inductive loop are inductively coupled when the footwear is disposed within the interior portion of the footwear housing.

11. The charging system according to claim 10, wherein the external inductive loop is configured to generate an alternating magnetic field.

12. The charging system according to claim 11, wherein the alternating magnetic field generated by the external inductive loop creates an alternating current in the internal inductive loop.

13. The charging system according to claim 12, wherein the current generated in the internal inductive loop is used to charge the rechargeable power source in the article of footwear.

14. The charging system according to claim 13, wherein the rechargeable power source is charged whenever the article of footwear is disposed within the interior portion of the footwear housing in a manner that aligns the internal inductive loop with the external inductive loop.

15. The charging system according to claim 14, wherein the footwear housing is configured to recharge a pair of footwear simultaneously using a pair of external inductive loops that may be coupled with corresponding internal inductive loops in the pair of footwear.

16. The charging system according to claim 15, wherein the rechargeable power source is configured to power an automatic fastening system.

17. A method of charging an article of footwear, comprising the steps of:
   connecting a footwear housing to an external power source, the footwear housing comprising a first panel portion and a second panel portion configured to open to provide access to an interior portion of the footwear housing and a charging station with an external inductive loop disposed within the interior portion;
   associating the article of footwear including an internal inductive loop with the interior portion of the footwear housing, the internal inductive loop being configured to transfer power to a rechargeable power source within the article of footwear;
   aligning the article of footwear within the interior portion of the footwear housing in a manner that inductively couples the internal inductive loop with the external inductive loop; and
   thereby charging the rechargeable power source; and
   wherein the footwear housing is sized and dimensioned so as to fit the article of footwear within the interior portion.

18. The method according to claim 17, wherein the rechargeable power source is configured to provide power to a lighting system of the article of footwear.

19. The method according to claim 17, wherein the step of aligning the article of footwear within the interior portion of the footwear housing includes a step of using at least one locating feature disposed on a floor portion within the footwear housing.

20. The method according to claim 17, wherein the step of associating the footwear housing with an external power source comprises a step of plugging in a cord to a wall socket.

* * * * *